United States Patent [19]
Herkimer

[11] Patent Number: 5,730,795
[45] Date of Patent: Mar. 24, 1998

[54] PROCESS FOR MANUFACTURING TITANIUM DIOXIDE PIGMENT HAVING A HYDROUS OXIDE COATING USING A MEDIA MILL

[75] Inventor: Scott Matthew Herkimer, Dickson, Tenn.

[73] Assignee: E. I. du Pont de Nemours and Company, Wilmington, Del.

[21] Appl. No.: 710,927

[22] Filed: Sep. 24, 1996

[51] Int. Cl.⁶ .................................................. C09C 1/36
[52] U.S. Cl. ................ 106/446; 106/436; 106/437; 106/438; 106/442; 423/610
[58] Field of Search ................ 106/437, 438, 106/442, 446, 436; 423/610

[56] References Cited

U.S. PATENT DOCUMENTS

| | | | |
|---|---|---|---|
| 27,818 | 11/1860 | Werner | 106/437 |
| 3,212,911 | 10/1965 | Berstein | 106/437 |
| 3,342,424 | 9/1967 | Whately | 241/21 |
| 3,640,744 | 2/1972 | Dietz et al. | 106/442 |
| 3,942,999 | 3/1976 | Hinley | 106/428 |
| 4,125,412 | 11/1978 | West | 106/446 |
| 4,448,609 | 5/1984 | Tear | 106/443 |
| 4,781,761 | 11/1988 | Jacobson | 106/446 |
| 5,203,916 | 4/1993 | Green et al. | 106/442 |
| 5,332,433 | 7/1994 | Story | 106/442 |
| 5,340,393 | 8/1994 | Jacobson | 106/492 |
| 5,501,732 | 3/1996 | Niedenzu | 106/447 |

FOREIGN PATENT DOCUMENTS 62-23989  5/1987  Japan.

*Primary Examiner*—Mark L. Bell
*Assistant Examiner*—Scott L. Hertzog

[57] ABSTRACT

This invention provides a process for making titanium dioxide pigment, wherein an aqueous slurry of hydrous oxide surface-treated $TiO_2$ particles is subjected to media milling. The $TiO_2$ particles are surface-treated with a coating comprising a hydrous oxide such as silica and/or alumina, and the slurry is filtered prior to media milling. The milled slurry is dried and the dried product is fluid-energy milled to produce $TiO_2$ pigment having good particle size distribution. The $TiO_2$ pigments may be used to make coating formulations having high gloss.

10 Claims, No Drawings

PROCESS FOR MANUFACTURING TITANIUM DIOXIDE PIGMENT HAVING A HYDROUS OXIDE COATING USING A MEDIA MILL

BACKGROUND OF THE INVENTION

1. Field of the Invention

The present invention relates to a process for making titanium dioxide pigment, wherein an aqueous slurry of hydrous oxide surface-treated titanium dioxide particles is subjected to media milling. The milled slurry is dried and the dried product is fluid-energy milled to form titanium dioxide pigment having good particle size distribution.

2. Description of the Related Art

Titanium dioxide ($TiO_2$) is commercially produced by the well known "chloride" and "sulfate" processes. In the "chloride process", titanium tetrachloride ($TiCl_4$) is oxidized in the vapor phase with an oxygen-containing gas, typically in the presence of aluminum chloride, to produce a hot gaseous suspension of $TiO_2$ solid particulate. This crude $TiO_2$ particulate undergoes subsequent treatment to produce a finished $TiO_2$ pigment product.

In Story et al., U.S. Pat. No. 5,332,433, a typical process for making pigmentary $TiO_2$ is outlined. The process involves the following steps: (1) dispersing the crude $TiO_2$ in an aqueous medium to form a slurry; (2) wet-milling the slurry; (3) precipitating hydrous oxides (e.g., alumina, silica) onto the particle surfaces of the wet-milled $TiO_2$; (4) recovering the hydrous oxide surface-treated $TiO_2$ from the aqueous medium by filtering; (5) washing and filtering the $TiO_2$ to remove salts and impurities therefrom; (6) drying the washed $TiO_2$ product; and (7) grinding the dried $TiO_2$ pigment product to a desired size using, for example, a fluid-energy mill.

Hinley et al., U.S. Pat. No. 3,942,999 also discloses that $TiO_2$ pigment is typically wet-milled prior to coating with one or more hydrous oxides.

Berstein et al., U.S. Pat. No. 3,212,911 describes a process for preparing $TiO_2$ pigment which is more readily dispersible in a liquid or plastic medium which involves mechanical attrition (e.g., ball, pebble, or colloid milling) of $TiO_2$ in the presence of a solution of alkali metal silicates, aluminates, or titanates. Subsequent to the milling step, the titanium dioxide can be after-treated with additional alkali metal compounds to effect coating of the particles with hydrous oxides (e.g., alumina or titania).

As described in Tear et al., U.S. Pat. No. 4,448,609, it is also known that aqueous slurries of $TiO_2$ pigment can be prepared, wherein the pigmentary particles have been surface-treated with one or more hydrous oxides comprising alumina. The $TiO_2$ is recovered from the aqueous medium by filtration and the resulting filter-cake is water washed. The solids concentration of the washed filter-cake is raised to above 60% by weight and a combination of dispersants comprising an amine dispersant and an anionic dispersant is introduced into the dispersion (wet filter-cake). The dispersion is then milled in a suitable milling machine using grinding elements such as ball mills, bead mills, or sand mills.

The present invention is directed to a process for manufacturing dry $TiO_2$ pigment product which is fluid-energy milled to provide a desirable particle size distribution in the final $TiO_2$ pigment product. As described above, in conventional processes for making such products, slurries of uncoated $TiO_2$ particles are wet-milled, and the resulting $TiO_2$ particles are coated with hydrous oxides. The wet-milled slurry of coated $TiO_2$ particles is filtered and dried, and the dry $TiO_2$ pigment is fluid-energy milled. This fluid-energy milling step is energy intensive and requires high capital investment.

It would be desirable to have a process for producing dry $TiO_2$ pigment product which could be run at lower energy costs while maintaining or improving product quality. It would also be desirable to improve $TiO_2$ pigment production rates without additional investment. The present invention provides a process which meets the foregoing needs.

SUMMARY OF THE INVENTION

The present invention provides a process for preparing a titanium dioxide pigment, comprising the steps of: a) preparing an aqueous slurry comprising base $TiO_2$ particles, b) applying a coating comprising a hydrous oxide to the base $TiO_2$ particles to provide a slurry comprising coated $TiO_2$ particles, c) filtering the slurry of coated $TiO_2$ particles to provide a dewatered slurry, d) media milling the dewatered slurry, e) drying the milled slurry to provide a dry $TiO_2$ pigment product, and f) fluid-energy milling the dry $TiO_2$ pigment product.

Although not required, a high solids aqueous slurry may be used, wherein the concentration of base $TiO_2$ particles in the aqueous slurry is in the range of about 30 to about 85 wt. % based on total weight of the slurry. Preferably, the coating comprises a hydrous oxide selected from the group consisting of silica, alumina, zirconia, and mixtures thereof. The hydrous oxide coating may comprise silica, wherein the amount of silica is typically in the range of about 0.5 to about 30 wt. % based on total $TiO_2$ pigment weight. Preferably, the amount of silica is in the range of about 2 to about 11 wt. %. The hydrous oxide coating may comprise alumina, wherein the amount of alumina is typically in the range of about 0.5 to about 10 wt. % based on total $TiO_2$ pigment weight. Preferably, the amount of alumina is in the range of about 0.5 to about 5 wt. %.

Preferably, the concentration of coated $TiO_2$ particles in the aqueous slurry is less than 40 wt. % based on total weight of the slurry prior to filtering of the slurry. Subsequent to filtering of the slurry, wherein the slurry is dewatered, the concentration of coated $TiO_2$ particles is greater than 30 wt. % and less than 60 wt. % based on total weight of the dewatered slurry.

The dewatered slurry may be media milled by feeding the slurry into a grinding chamber containing media beads, and the milled slurry may be dried to less than 5 wt. % water. The dry $TiO_2$ pigment product may be fluid-energy milled by feeding the slurry into a chamber with air or steam.

DETAILED DESCRIPTION OF THE INVENTION

The present invention provides a process for making titanium dioxide pigment, wherein a slurry of hydrous oxide surface-treated $TiO_2$ particles is subjected to media milling. The milled slurry is dried and the dry product is fluid-energy milled to form $TiO_2$ pigment having good particle size distribution.

The $TiO_2$ used to prepare the pigment of the invention can be of the conventional rutile variety, prepared by either the chloride or sulfate process. The chloride process is preferred. This process typically comprises oxidizing with oxygen or an oxygen-containing gas, a mixture of $TiCl_4$ and $AlCl_3$, the amount of $AlCl_3$ being sufficient to form 0.1–1.5% $Al_2O_3$ in the $TiO_2$.

In the process of this invention, an aqueous slurry of base $TiO_2$ particles is first prepared by techniques known in the art. By "base $TiO_2$ particles", it is meant that the $TiO_2$ particles comprising the pigment have not been coated by a surface-treatment process. Preferably, these base $TiO_2$ particles have an average primary particle size less than about 0.4 microns. The base $TiO_2$ particles are dispersed in water to form a slurry. The concentration of base $TiO_2$ particles in the slurry will vary depending on the subsequent coating process. Typically, the slurry has a $TiO_2$ pigment solids (base $TiO_2$ particles) content of greater than 30 wt. % based on the total weight of the slurry. Preferably, the $TiO_2$ pigment solids content is in the range of about 30 to about 85 wt. %.

The $TiO_2$ particles of the aqueous slurry are then surface-treated with a coating comprising a hydrous oxide by techniques known in the art to provide a slurry of coated $TiO_2$ particles. Conventional coating processes can be used. Examples of coating processes include U.S. Pat. Nos. Re. 27,818; 4,781,761; 4,125,412, the disclosures of which are hereby incorporated by reference. The present invention is not limited to these processes and many other known coating processes may be used. Generally, these coating techniques involve adding a coating solution to the slurry and adjusting the temperature and pH of the slurry such that the hydrous oxide is precipitated onto the surface of the particles at the desired weight percentage. For example, a solution containing sodium silicate can be added to the slurry and the pH of the slurry will increase to above 8, and usually above 11. The pH of the slurry is then gradually reduced over a period of several hours by addition of dilute acid (e.g., HCl) to the slurry. As acid is added, $SiO_2$ is deposited onto the surfaces of the $TiO_2$ particles.

Suitable hydrous metal oxides include, for example, oxides of silicon, titanium, zirconium, zinc, magnesium, aluminum, yttrium, antimony, cerium, and tin. Preferably, the coating comprises a hydrous oxide selected from the group consisting of silica, alumina, zirconia, and mixtures thereof. For purposes of this invention, if the coating contains silica, the silica will generally constitute about 0.5 to about 30 wt. % of the total $TiO_2$ pigment weight, and will preferably be in the range of 2 to 11 wt. %. If the coating contains alumina, the alumina will generally constitute about 0.5 to about 10 wt. % of the total $TiO_2$ pigment weight, and will preferably be in the range of 0.5 to 5 wt. %. In some instances, alumina may be precipitated onto the $TiO_2$ particles as a topcoat by first curing the surface-treated particles of the slurry and then adding sodium aluminate to the slurry and adjusting the pH.

Exiting the coating step, the slurry has typically less than 40 wt. % solids. This slurry is then filtered, washed, and refiltered to provide a dewatered slurry by known techniques. As used herein, by the term "dewatered slurry", it is meant that the slurry has been filtered. Optionally, during the filtration process, grinding aids such as polyols (e.g., trimethylolpropane), alkanol amines (e.g., triethanolamine and 2-amino-2-methyl-1-propanol), and others can be added to the slurry. After filtration, washing and refiltration, the slurry has a solids content (coated $TiO_2$ particles) of greater than 30 wt. %. Preferably, the concentration of solids is less than 60 wt. %. More preferably, the concentration of solids is in the range of 30 to 50 wt. %

After the filtration, washing, and refiltration steps, the dewatered $TiO_2$ slurry is subjected to media milling. Media milling, for the purposes of the present invention, can be accomplished in any suitable manner, for example, by ball, sand or pebble milling, or by means of other types of media. Many types of media or different sizes may be used, with one of ordinary skill in the art being able to adjust the media to produce the desired result based on the size distribution of the particles in the starting material according to conventional protocols. The $TiO_2$ slurry is fed into a grinding chamber which is packed with media beads. The media is stirred in the grinding chamber by a series of discs attached to a rotating shaft. The motion of the media is perpendicular to the direction in which the slurry is pumped, and therefore the $TiO_2$ particles are sheared by the media. Typically, a screen keeps the media inside the grinding chamber but allows the $TiO_2$ slurry out of the mill. Optionally, the product of the mill can be further screened.

It has been surprisingly found that by incorporating a media milling step after hydrous oxide surface-treatment rather than before the surface-treatment, enhancement in particle size reduction is achieved. Enhanced particle size reduction provides the following advantages in a process to prepare $TiO_2$ pigments: 1) reduction in energy requirements of the manufacturing process, 2) increased $TiO_2$ pigment production rate, and 3) improved $TiO_2$ pigment product quality.

After media milling, the slurry is dried by a suitable means such as, for example, flash drying, spray drying, or an oven. Preferably, the slurry is dried to less than 5 wt. % water, and more preferably less than 0.7 wt. % water.

Finally, the dry $TiO_2$ pigment product is subjected to fluid-energy milling. In a fluid-energy mill, a fluid, e.g., air or steam, is used in the grinding of the $TiO_2$ pigment. In the fluid-energy milling process of U.S. Pat. No. 4,427,451, the disclosure of which is hereby incorporated by reference, the dry $TiO_2$ pigment is introduced with air or steam into the outer portion of an inwardly spiraling vortex so as to convey the $TiO_2$ at high velocity against the housing of the spiral vortex in order to fracture $TiO_2$ agglomerates.

The dry $TiO_2$ pigments produced by the process of this invention have low particle agglomeration. The particle agglomeration of the pigment is typically measured in terms of its particle size distribution (coarse tail). Pigments, wherein a low weight percentage of the particles (e.g., less than 30%) have a particle diameter size greater than 0.6 microns, tend to have low particle agglomeration and coatings (e.g., paints) made with such pigments tend to have high gloss. Pigments, wherein a high weight percentage of the particles have a particle diameter size greater than 0.6 microns, tend to have greater particle agglomeration and finished products made with such pigments tend to have lower gloss.

The present invention is further illustrated by the following examples, but these examples should not be construed as limiting the scope of the invention.

Test Methods

Particle Size Distribution

Particle size distributions of the pigment products were measured by sedimentation analysis, with a Sedigraph* (Micromeritics Instrument Corp., Norcross, Ga.) after dispersion in aqueous suspension by fixed level sonication. The particle size measurement and the % >0.6 microns fraction will indicate the potential for peak gloss in the finished product, a value that cannot be exceeded while applying any reasonable energy level.

Emulsion Gloss

Emulsion (TFW-182) Gloss was determined by preparing an emulsion paint formulation using a slurry sample, making draw-downs of the paint on black PVC panels, drying the panels for 3 hours in a constant temperature, constant humidity (CTCH) cabinet, measuring 60 degree gloss using a Hunter gloss meter (available from Hunter Laboratories, Reston, Va.), and calculating gloss in relation to reflectance values of standards.

Alkyd Gloss

Alkyd Gloss was determined by dispersing pigment in an alkyd vehicle. The dispersion was sand milled and reduced with resin to spray consistency. Aluminum panels were spray painted using automatic spraying equipment under controlled conditions to produce uniform thickness and surface characteristics. The paint films were baked. Gloss was determined by measuring 20 degree reflectance of the panels with a Hunter gloss meter and calculating gloss in relation to reflectance values of standards.

EXAMPLES

Comparative Example A

Base $TiO_2$ was prepared by the chloride process as disclosed in U.S. Pat. Nos. 2,559,638, and 2,488,439. Base $TiO_2$ was slurried in water and coated with alumina and silica as disclosed in U.S. Pat. No. 4,781,761. After the coating step, the coated $TiO_2$ containing slurry was filtered using 0.25% trimethylolpropane (TMP), spray dried and fluid-energy milled at a steam to pigment ratio of 4.2 lbs of steam per lb of pigment in a 27" vortac fluid-energy mill. The particle size distribution, emulsion gloss, and alkyd gloss were measured per the Test Methods above, and the results are reported below in Table 1.

Comparative Example B

Base $TiO_2$ slurry having a gram per liter of approximately 325–350 was neutralized to a pH of 7.0 and media milled. Media milling conditions were 2100 ft/min disk tip speed, 85% media charge, power load of approximately 29–30 kwatts. The media milled $TiO_2$ slurry was coated following the same process as described in Comparative Example A, filtered using 0.25% TMP, dried and fluid-energy milled at 4.5 lbs of steam per lb of pigment. The particle size distribution, emulsion gloss, and alkyd gloss were measured per the Test Methods above, and the results are reported below in Table 1.

Example 1

Base $TiO_2$ was prepared and coated following the same process as described in Comparative Example A. The slurry of coated $TiO_2$ particles was filtered using 0.25% TMP and washed in the same manner as described in Comparative Example B. The dewatered slurry was then media milled in the same manner as described in Comparative Example B. Media mill discharge was dried and fluid-energy milled at 4.3 lbs of steam per lb of pigment in the same manner as described in Comparative Example B. The particle size distribution, emulsion gloss, and alkyd gloss were measured per the Test Methods above, and the results are reported below in Table 1.

TABLE 1

| Example | % > 0.6 Micron | Emulsion Gloss | Alkyd Gloss |
|---------|----------------|----------------|-------------|
| A*      | 11.2           | 53             | 28          |
| B*      | 8.0            | 55             | 36          |
| 1       | 6.5            | 57             | 41          |

*Comparative Examples

As can be seen from Table 1, best results, i.e. lowest % >0.6 micron and highest gloss values, were achieved by the pigment product of Example 1 in which media milling occurred after coating with hydrous oxides. While media milling prior to coating with hydrous oxides (Comparative Example B) improved pigment properties relative to no media milling (Comparative Example A), it can be seen that still further improvement was achieved by incorporating the media milling step after coating with hydrous oxides.

I claim:

1. A process for preparing a titanium dioxide pigment, comprising the steps of:

a) preparing an aqueous slurry comprising base $TiO_2$ particles, b) applying a coating comprising a hydrous oxide to the base $TiO_2$ particles to provide a slurry comprising coated $TiO_2$ particles, c) filtering, washing and refiltering the slurry comprising the coated $TiO_2$ particles to provide a filtered slurry of 30% to less than 60% solids by weight, d) media milling the filtered slurry, e) drying the milled slurry to provide a dry $TiO_2$ pigment product, and f) fluid-energy milling the dry $TiO_2$ pigment product wherein steps a–c are performed prior to any media milling of the base $TiO_2$.

2. The process of claim 1, wherein the concentration of base $TiO_2$ particles in the aqueous slurry of step a) is in the range of about 30 to about 85 wt. % based on total weight of the slurry.

3. The process of claim 1, wherein the hydrous oxide is selected from the group consisting of silica, alumina, zirconia, and mixtures thereof.

4. The process of claim 3, wherein the hydrous oxide comprises silica and the amount of silica is in the range of about 0.5 to about 30 wt. % based on total $TiO_2$ pigment weight.

5. The process of claim 3, wherein the hydrous oxide comprises alumina and the amount of alumina is in the range of about 0.5 to about 10 wt. % based on total $TiO_2$ pigment weight.

6. The process of claim 1, wherein the concentration of coated $TiO_2$ particles in the aqueous slurry is less than 40 wt. % based on total weight of the slurry prior to filtering of the slurry.

7. The process of claim 1, wherein the filtered slurry is media milled by feeding the slurry into a grinding chamber containing media beads.

8. The process of claim 1, wherein the milled slurry is dried to less than 5 wt. % water.

9. The process of claim 1, wherein the dry $TiO_2$ pigment product is fluid-energy milled by feeding the slurry into a chamber with air or steam.

10. The process of claim 3, wherein hydrous oxide comprises a mixture of silica and alumina, wherein the silica is in the range of about 2 to about 11 wt. % based on total $TiO_2$ pigment weight and the alumina is in the range of about 0.5 to about 5 wt. % based on total $TiO_2$ pigment weight.

* * * * *